April 21, 1959

O. H. BANKER 2,883,026

FLUID PRESSURE OPERATED CLUTCH

Filed Jan. 21, 1955

2 Sheets-Sheet 2

INVENTOR.
Oscar H. Banker
BY
Charles F. Vajtech
Attorney

United States Patent Office 2,883,026
Patented Apr. 21, 1959

2,883,026

FLUID PRESSURE OPERATED CLUTCH

Oscar H. Banker, Evanston, Ill., assignor to New Products Corporation, Skokie, Ill., a corporation of Delaware Application January 21, 1955, Serial No. 483,259

3 Claims. (Cl. 192—85)

This invention relates to power transmitting devices for heavy duty automotive vehicles, such as track-laying tractors and particularly to a transmission which is readily removable from its housing with a minimum disturbance of associated parts.

Because of the heavy shock loads to which earth moving equipment such as track-laying tractors or the like may at times be subjected, and the long hours of continuous operation required of such transmissions, it is at times necessary to remove a complete transmission for overhaul or replacement. In transmissions heretofore designed for these vehicles such removal can be accomplished only by disassembling the various components of the transmission and removing them piece-meal, or by a disassembly of the mechanism driven by the transmission. In either event, the time and labor required to effect the removal of the transmission is considerable, making this operation a costly one.

It is an object of this invention to provide a transmission for heavy automotive equipment such as track-laying tractors which transmission will be readily removable from its housing as a complete unit.

A more specific object of this invention is the provision of a transmission for a track-laying vehicle wherein the transmission may be removed as a unit from its housing by unfastening a plurality of readily accessible bolts and then slightly collapsing the transmission to reduce its axial dimension such that it may be moved bodily transversely of the axis thereof and out of the housing.

As a still more specific object this invention seeks to provide a transmission for a track-laying vehicle, said transmission being comprised of substantially duplicate subassemblies symmetrically arranged about a center line, the end subassemblies comprising multiple plate clutches, with means for moving the plates and the clutches inwardly toward the center line a sufficient distance to clear a shoulder on which the clutches are centered, whereupon the transmission may be removed from its housing by a transverse bodily movement thereof.

Figure 1:
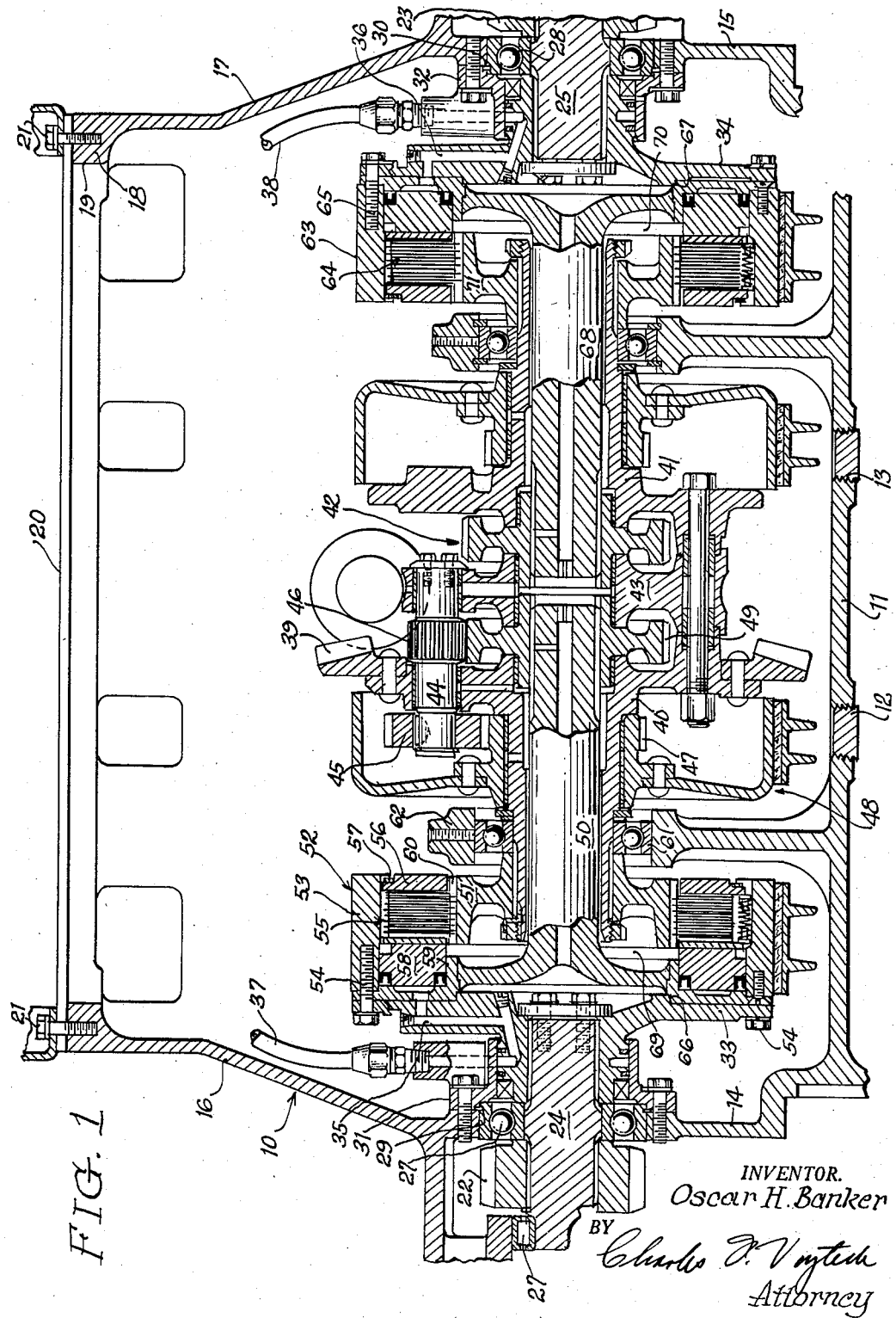
Figure 2:
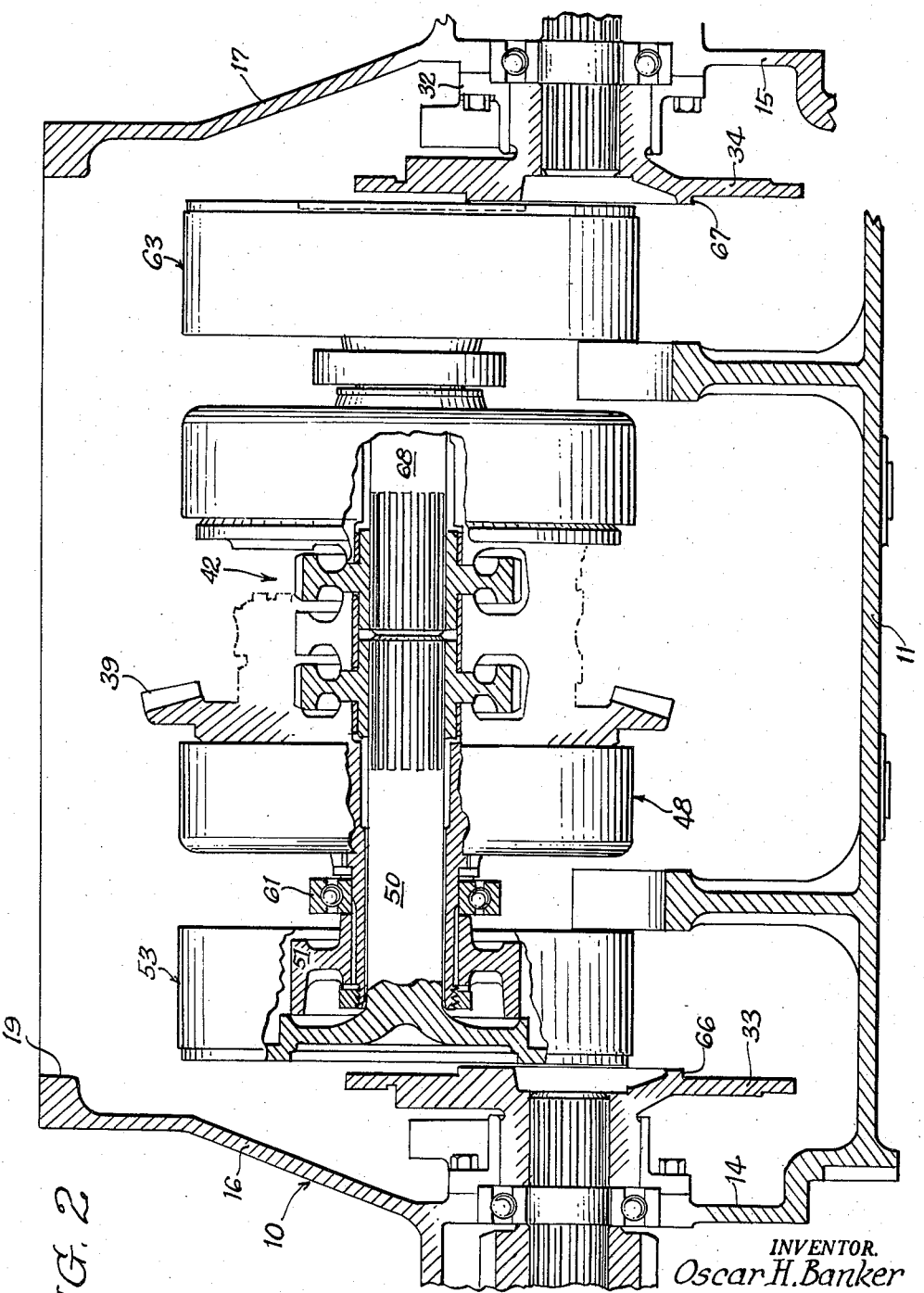

These and other objects of this invention will become apparent from the following detailed description when taken together with the accompanying drawings in which, Fig. 1 is a cross section through a transmission incorporating the features of this invention and shown installed in a transmission housing; and Fig. 2 is a corresponding view, partly schematic showing the transmission axially collapsed and ready for removal from the housing.

Referring now to the drawings for a detailed description of the invention, and particularly to Fig. 1 there is shown a housing 10 having a bottom wall 11, with suitable drain openings 12 and 13 therein, and side walls 14 and 15. The upper portions 16 and 17, respectively, of the side walls are inclined inwardly and terminate in a top inwardly projecting flange 18 defining an opening 19 through which access may be had to the interior of the housing. Opening 19 may be closed by a cover plate 20 secured to flange 18 by suitable bolts 21.

The tracks of the vehicle are driven by left-hand and right-hand bull gears 22, 23 respectively, the latter being shown only as a fragment, it being understood that the two gears are substantially identical. Each bull gear is in turn splined to a drive shaft 24, 25, respectively, the shafts in turn being mounted for rotation in antifriction bearings 26, 27 on the left-hand side and 28 on the right-hand side, it being understood that a bearing similar to 26 is also provided for shaft 25 but is omitted for the sake of simplicity. Bearings 27 and 28 are held against axial movement relative to side walls 14 and 15 by snap rings 29 and 30, respectively and by flanged sleeves 31 and 32, respectivey, bolted to side walls 14 and 15.

Splined to each shaft 24, 25 are driven plates 33, 34, respectively, which transmit the drive from the transmission to shafts 24 and 25. Said driven plates may contain passageways 35, 36 which may be connected through suitable aligned openings in sleeves 31, 32 to sources of fluid under pressure 37, 38 under the control of valves (not shown) by which certain shiftable members of the transmission may be controlled from the exterior of the transmission.

The transmission itself may comprise an input bevel gear 39 driven by a pinion (not shown) from the engine of the vehicle. Said bevel gear 39 is secured to flanged sleeve 40, which with companion sleeve 41 constitute the carriers for duplicate planetary gear sets designated generally by the reference character 42. A central disc 43 forms part of the carrier and serves as a spacer for flanged sleeves 40 and 41 and also as the inner support for planetary gear shafts 44. It is understood that a plurality of such shafts 44 is used, alternate ones extending to the left and right of central disc 43. Each gear shaft 44 has formed or mounted thereon spaced planetary gears 45, 46, the former meshing with a sun gear 47 adapted to be held against rotation by a brake 48 and the latter meshing with a sun gear 49 splined to a central shaft 50.

Flanged sleeve 40 is splined at its left hand end as viewed in Fig. 1 to the driving hub 51 of a multiple plate friction clutch 52, the driven element 53 of which is secured to driven plate 33 by a plurality of bolts 54. Clutch 52 is comprised of a plurality of annular friction plates 55, alternate ones of which are splined to driving hub 51 and driven member 53. The reaction plate 56 for clutch 55 is held against axial movement in one direction relative to driven member 53 by a snap ring 57. The pressure plate 58 is mounted in a suitable annular recess 59 in driven member 53. The latter may be formed as a separate piece, or if desired, it may be formed integrally with shaft 50 as a flange extending radially outwardly therefrom. It should be noted that friction clutch 52, including pressure plate 58, reaction plate 56 and the intermediate clutch discs 55, may be slid bodily axially on driving hub 51, the splines 60 by which plates 55 are driven being sufficiently long to accommodate a predetermined amount of such axial movement.

Between hub 51 and sun gear 47 is an antifriction bearing 61 the retainer 62 for which is split so that the top half thereof may be removed to permit the bearing 61 to be moved bodily upwardly out of the retainer.

The construction of the transmission for driving the right-hand track is identical to that just described with reference to the left-hand track-driving transmission and hence it will not be described here in detail. Suffice it to say that the driven member 63 of friction clutch 64 is secured to driven plate 34 by a plurality of bolts 65 extending axially of driven member 63 and corresponding in function to bolts 54 of the left-hand portion of the transmission.

Driven plates 33 and 34 are formed with shoulders 66 and 67, respectively, into which the annular flange regions of shaft 50 of the left-hand portion of the transmission, and of shaft 68 of the right-hand portion of the transmission, extend and by which said shafts are centered relative to plates 33, 34 and their corresponding shafts 24 and 25, respectively. It should be noted that the inner ends of shafts 50 and 68 are spaced from one another by a distance which is greater than the sum of the axial dimensions of shoulders 66 and 67, and that therefore said shafts may move toward one another relatively to their respective sun gears to which they are splined without disturbing their connection to said sun gears. It may also be noted that spaces 69 and 70 are provided between the driving hub 51 of the left-hand clutch 52 and hub 71 of the right-hand clutch 64, and the radially extending portions of the driven members 53 and 63 adjacent thereto, said spaces each likewise being larger in axial direction than the axial depth of the shoulders 66 and 67. It is thus possible, by removing bolts 54 and 65, to collapse the transmission axially by sliding the driven members 53 and 63 and their associated mechanisms and shafts 50 and 68 toward one another until they are entirely clear of shoulders 66 and 67. Inasmuch as no portion of the mechanism driven thereby extends axially inwardly of said shoulders it is then possible, assuming that the split bearing supports 62 have been separated, to raise the entire transmission upwardly through opening 19 and out of the vehicle.

Thus to remove a transmission from its casing 10, it is only necessary to reach into the casing through opening 19 and unfasten each bolt 54 and 65, the transmission being rotated from bolt to bolt to make each accessible from the opening 19, and then to remove the upper halves of the journals 62, whereupon, as shown in Fig. 2, the driven members 53 and 63 may be slid together and the transmission is then free to be pulled upwardly through opening 19. The subsequent reassembly of that transmission, or of its replacement with the bull gears can be effected equally as readily, the steps described being performed in reverse order. It is understood, of course that the mechanism for operating brakes 48 can be disassociated from housing 10 and the bands removed with the transmission.

It is understood that the foregoing description is merely illustrative of a preferred embodiment of this invention and that the scope of the invention therefore is not to be limited thereto but is to be determined by the appended claims.

I claim:

1. A clutch structure comprising an axially fixed hollow hub, a friction plate rotatable with and mounted on the hub for axial movement thereon, and an assembly adapted to engage the plate to transmit a drive therebetween, said assembly comprising a shaft concentrically supported in said hollow hub and relatively axially movable therein, a flange extending outwardly from said shaft, an annular housing mounted on the flange, axially spaced friction means in the housing arranged to receive therebetween the said friction plate to engage said plate as aforesaid, fluid pressure operated means in the housing constructed to clamp the friction means upon the said plate, an axially fixed shaft mounted coaxially with respect to the first-mentioned shaft, a radially extending flange on the axially fixed shaft, and readily separable means for securing the housing to the flange on the fixed shaft, said housing and flange on the fixed shaft having communicating passages for conducting fluid under pressure therebetween.

2. A clutch structure as described in claim 1, and axially interengaging means on the flanges for centering said flanges with respect to one another, said flanges being axially separable upon separation of the securing means for the housing and flange on the fixed shaft, whereby to move said flanges relative to one another transversely of the axes of said shafts.

3. A clutch structure as described in claim 1, said housing comprising a cylindrical outer member defining the outer cylindrical wall of an annular pressure differential operated fluid motor, an annular plate having an axially extending portion and forming the back and inner cylindrical wall of the said motor, and an annular piston in the space defined by the outer and inner cylindrical walls and the plate.

References Cited in the file of this patent

UNITED STATES PATENTS

| | | |
|---|---|---|
| Re. 19,876 | Criley | Mar. 3, 1936 |
| 2,108,165 | Criley | Feb. 15, 1938 |
| 2,158,935 | Gustafson | May 16, 1939 |
| 2,290,542 | Criley | July 21, 1942 |
| 2,403,322 | Acton | July 2, 1946 |
| 2,403,326 | Baker et al. | July 2, 1946 |
| 2,569,651 | Bannan | Oct. 2, 1951 |